Dec. 25, 1962 F. E. DRUMMOND 3,070,618
PROCESS FOR PRODUCING POLYISOCYANATES FROM
POLYAMINES AND CARBON MONOXIDE
Filed Dec. 15, 1958
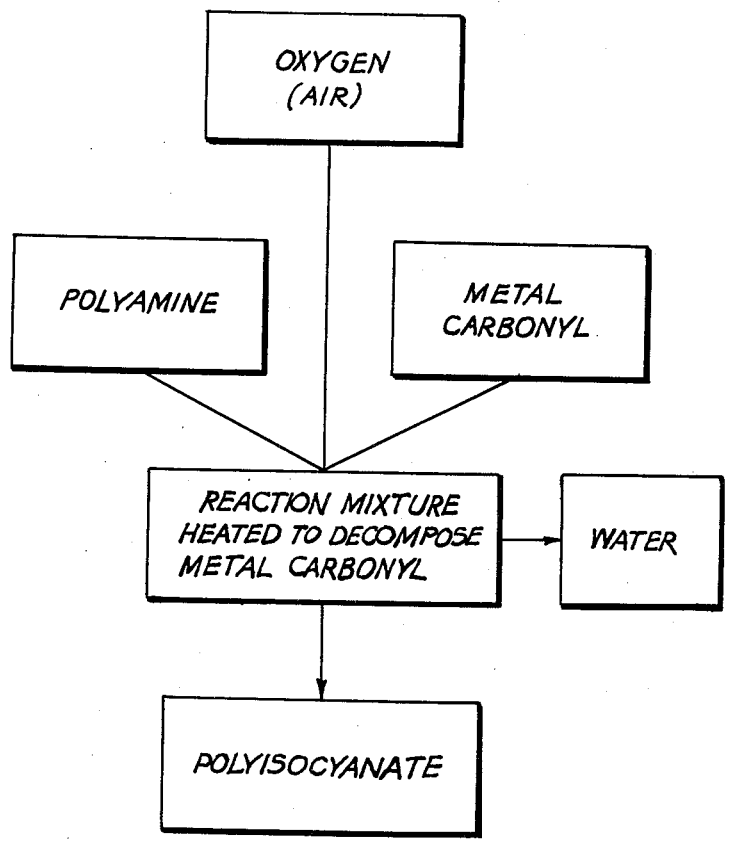
INVENTOR
FOLSOM E. DRUMMOND
BY Toulmin & Toulmin
ATTORNEYS 3,070,618
PROCESS FOR PRODUCING POLYISOCYANATES
FROM POLYAMINES AND CARBON MONOXIDE
Folsom E. Drummond, Washington, D.C., assignor to Basic Research Corporation, Dayton, Ohio, a corporation of Delaware
Filed Dec. 15, 1958, Ser. No. 780,574
9 Claims. (Cl. 260—453)

This invention relates to a process for making isocyanates and more especially polyisocyanates.

An object of the invention is to provide a a commercially feasible and economically workable method for preparing polyisocyanates.

A further object of the invention is to provide a continuous method of producing polyisocyanates.

Other objetcs and advantages will be apparent to those skilled in the art as the description of the invention proceeds.

Polyisocyanates, especially diisocyanates, find important use in the commercial preparation of polyurethanes. This term "polyurethanes" refers to a relatively new class of polymers which are prepared by the reaction of polyisocyanates with various hydroxyl-containing compounds and which form a polymer having repeating urethane linkage units. The polyurethanes have come into widespread use, for example in the production of flexible as well as rigid foams, polyester plastic molded articles, adhesives, coatings and the like. As a fast-setting glue polyurethane extrudible plastics have been used to mend broken bones and to replace missing or decayed bone structure.

Conventional methods used to prepare the polyisocyanates involve the production of these polyisocyanates by reacting appropriate amines with phosgene. Such processes release corrosive gases, such as hydrogen chloride, and corrode the equipment and necessitate the use of expensive equipment.

The present invention provides a process which eliminates, for all practical purposes, these difficulties and greatly simplifies the production of polyisocyanates.

In accordance with the process of the present invention, a polyamine is reacted directly with a metal carbonyl or suitable mixture of carbon monoxide and oxygen under catalytic conditions to produce the corresponding polyisocyanate. The reaction may be broadly illustrated as follows, wherein use is made of a metal carbonyl which is decomposed in situ to provide catalytic metal and free radical (CO) ions:

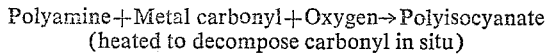
Polyamine+Metal carbonyl+Oxygen→Polyisocyanate
(heated to decompose carbonyl in situ)

Accordingly, by carrying out the reaction at a temperature to cause the thermal decomposition of the metal carbonyl, and maintaining the temperature above 100° C., the water formed during the reaction may be boiled off and the polyisocyanate recovered. The reaction is catalyzed by the metal which is released in a pure molecular form, and in the form of ionized metal particles of fine submicron size upon thermal decomposition of the metal carbonyl. The catalytic metal particles may be recovered by suitable filtration of the reaction mass. Preferably the oxygen is supplied as substantially pure oxygen rather than as air, otherwise the efficiency of process and yield of the polyester is adversely affected.

In accordance with the process of the present invention it is possible to produce various polyesters, particularly polyurethane and mixtures of the same by starting with appropriate materials and carrying out the catalyzed condensation reaction.

The drawing illustrates diagrammatically a flow sheet of the steps employed in carrying out the process employing an amine and a metal carbonyl. While the reaction is preferably carried ont in the vapor phase, it may be effected in the presence of inert liquid solvents, for example utilizing benzene, toluene, xylene or the like. In the vapor phase reaction employing gaseous inerts, the diluents may be nitrogen, carbon dioxide, helium, argon, etc. The temperature to which the reactants are subjected during the reaction ranges between 100° C. and 350° C. or higher, depending upon the materials and reacting temperatures required. Atmospheric or subatmospheric pressures may be employed in carrying out the process depending on the reactants and their vapor pressures.

Where the reaction is carried out at a lower temperature than that required to release the water as vapor, the same may be driven off by heating the final polyisocyanate product to a temperature and pressure to boil off the water.

The invention is particularly useful in the preparation of di- and tri-isocyanates. Tolylene diisocyanates when treated with poly functional hydroxyl compounds such as polyesters having hydroxyl groups produce polyesters which may be used in the preparation of foams, coatings and the like as desired. The properties of the polyurethanes vary depending upon the particular raw material and compounds used. The following is given as examples for the preparation of tolylene diisocyanates.

*Example I*

2 mols of meta-tolylene diamine are sprayed into a heated reaction chamber together with nickel carbonyl and oxygen and reacted at the decomposition temperature of nickel carbonyl, namely 135–150° C. forming meta-tolylene diisocyanate. The latter is condensed at a temperature of 110° C. and the water is driven off as steam.

*Example II*

The process is carried out as in Example I, using naphthylene diamine to form naphthalene diisocyanate which is recovered at a temperature of approximately 125° C. Naphthalene diisocyanate has a boiling point of 135–140° C. and thus is recovered by condensing the same below this boiling point temperature and while maintaining the reaction above 100° C. so that the water formed is driven off.

*Example III*

The process is carried out as in Example I using diphenylmethylene diamine to produce the diphenylmethylene diisocyanate. These are recovered by carrying out the reaction at a temperature of 185° C.–190° C. being below the boiling point of this diisocyanate which is around 200° C.

*Example IV*

The process is carried out as in Example I, using phenylene diamine to form phenylenediisocyanate which reaction is carried out at 110° C.

*Example V*

In this instance the reaction is carried out as described in Example I, wherein the catalyst is introduced as finely divided particles (average 5 micron size magnesium particles), with the required mol amounts of carbon monoxide and oxygen being introduced simultaneously along with the two mols of the amine and carrying out the reaction at 150° C. to produce the tolylene diisocyanate.

The catalyst used in carrying out the process may consist of a mixture of different metal carbonyls or singly, and wherein the reaction temperature is such as to cause thermal decomposition of the metal carbonyl. For example, suitable mixtures of titanium and nickel carbonyl may be used. Further, in some instances mixtures of a metal carbonyl with a heat-decomposable organo metal compound, e.g., aluminum isobutyl, magnesium ethyl or the like may be used. A synergistic catalytic action of the combination may thus be obtained.

Other polyisocyanates may likewise be produced utilizing the pyrolytic catalyzed process of this invention. Examples of such polyisocyanates and their molecular weights are for example—

|  | Mol. weight |
|---|---|
| 4,4' diphenylmethane diisocyanate CH$_2$(C$_6$H$_4$NCO)$_2$ | 250.25 |
| 1,4 phenylene diisocyanate C$_6$H$_4$(NCO)$_2$ | 160.13 |
| 4,4',4'' triphenylmethane triisocyanate CH(C$_6$H$_4$NCO)$_3$ | 367.34 |
| Octadecyl isocyanate C$_{18}$H$_{37}$NCO | 295 |
| Phenyl isocyanate C$_6$H$_5$NCO | 119.12 | the di- and triisocyanates, e.g. tolylene diisocyanate treated with polyfunctional hydroxyl compounds, such as polyesters having hydroxyl groups produce polyurethanes. The properties of these polyurethanes vary depending on the particular raw material or compounds used to react with the polyisocyanate. Linear polyesters tend to produce rubbery flexible foams whereas highly branched polyesters when reacted with this diisocyanate give a hard rigid foam or plastic.

In carrying out the process, for example with tolylene diamine the same may be sprayed in the form of a liquid into the top of a reaction chamber and circulated or moved in counter-current direction to a gaseous phase comprising metal carbonyl and oxygen, and wherein the reaction may be carried out in the presence of an inert gas such as helium or argon and containing the requisite oxygen content. The reactants are present in the amounts to combine under the catalytic action of the metal which is released in nascent form upon decomposition of the metal carbonyl.

Tolylene diisocyanate is liquid at room temperature and can be readily handled and stored. Two isomers are obtained in commercial production

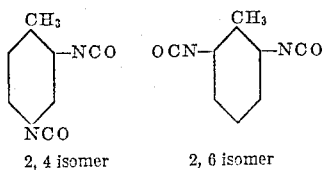

2, 4 isomer    2, 6 isomer tolylene diisocyante—80:20 ratio by weight of 2, 4 to 2, 6 isomers In the preparation of foams, reactions between a diisocyanate, one or more polyesters and water takes place. The diisocyanate joins the polyester molecules together converting these liquid, low molecular weight polymers into very high molecular weight rubbery or rigid polymers. The final product depends on the choice of polyesters used. Linear polyesters tend to produce rubbery flexible foams whereas highly branched polyesters give hard, rigid foams.

While certain examples have been given and a representative embodiment illustrated for carrying out the process and details have been shown for the purpose of illustrating the invention, it will be apparent to those skilled in the art that various changes may be made therein without departing from the spirit and scope of the invention and as set forth in the appended claims.

What is claimed is:

1. A process of producing a polyisocyanate which comprises reacting an aromatic polyamine with a thermally decomposable metal carbonyl and oxygen at a temperature of between about 100° C. and 350° C. to cause decomposition of said metal carbonyl to release carbon monoxide and metal to catalyze the reaction with the formation of a reaction product comprising polyisocyanate of said diamine and water, said aromatic polyamine being selected from the group consisting of metatolylene diamine, naphthylene diamine, diaphenylmethylene diamine and phenylene diamine, and heating said reaction product to volatilize said water and recovering a residue consisting of said polyisocyanate, said metal carbonyl beinng selected from the group consisting of nickel carbonyl and titanium carbonyl and mixtures thereof.

2. A process of producing polyisocyanates from aromatic polyamines which comprises reacting an aromatic amine with a metal carbonyl at a temperature of between 100° C. and 350° C. and under sub-atmospheric pressure conditions and in the presence of a finely divided metal catalyst which is released in situ during the reaction, said aromatic polyamine being selected from the group consisting of metatolylene diamine, naphthylene diamine, diphenylmethylene diamine and phenylene diamine, and heating the resultant reaction mass to volatilize and separate the water therefrom as steam and recovering the polyisocyanate of said diamine as residue, said metal carbonyl being selected from the group consisting of nickel carbonyl and titanium carbonyl and mixtures thereof.

3. A process of producing tolylene diisocyanate which comprises reacting tolylene diamine with a thermally decomposable carbonyl in the presence of oxygen and wherein the reaction is carried out at a temperature of between about 100° C. and 350° C. to cause thermal decomposition of said metal carbonyl, and heating the resultant reaction mass to drive off water formed as a by-product to recover said tolylene diisocyanate, said metal carbonyl being selected from the group consisting of nickel carbonyl and titanium carbonyl and mixtures thereof.

4. A process of producing naphthalene diisocyanate which comprises reacting naphthylene diamine with a thermally decomposable metal carbonyl in the presence of oxygen and wherein the reaction is carried out at a temperature of between about 100° C. and 350° C. to cause thermal decomposition of said metal carbonyl, and heating the resultant reaction mass to drive off water formed as a by-product to recover said naphthalene diisocyanate, said metal carbonyl being selected from the group consisting of nickel carbonyl and titanium carbonyl and mixtures thereof.

5. A process of producing diphenylmethylene diisocyanate which comprises reacting diphenylmethylene diamine with a thermally decomposable metal carbonyl in the presence of oxygen and wherein the reaction is carried out at a temperature of between about 100° C. and 350° C. to cause thermal decomposition of said metal carbonyl, and heating the resultant reaction mass to drive off water formed as a by-product to recover said diphenylmethylene diisocyanate, said metal carbonyl being selected from the group consisting of nickel carbonyl and titanium carbonyl and mixtures thereof.

6. A process of producing tolylene diisocyanate which comprises reacting tolylene diamine with a thermally decomposable metal carbonyl in the presence of oxygen and wherein the reaction is carried out at a temperature of between about 100° C. and 350° C. to cause thermal decomposition of said metal carbonyl and formation of a reaction mass comprising tolylene diisocyanate and water, and heating said reaction mass to drive off said water to recover said tolylene diisocyanate, said metal carbonyl consisting of nickel carbonyl.

7. A process of producing tolylene diisocyanate as in claim 6, and wherein said reaction is catalyzed by the addition of a thermally decomposable aluminum isobutyl compound.

8. A process of producing tolylene diisocyanate as in claim 6, and wherein a mixture of two thermally decomposable metal carbonyls is used in place of said nickel carbonyl in the presence of oxygen and the reaction is carried out at a temperature to cause thermal decomposition of said mixture of metal carbonyls, and wherein the metal carbonyls are nickel carbonyl and titanium carbonyl.

9. A process of producing polyisocyanates which consists in spraying liquid tolylene diamine into a reaction chamber filled with gaseous nickel carbonyl admixed with oxygen, annd heating the resultant gaseous mixture to a temperature of 135° to 150° C. to cause thermal decomopsition of the nickel carbonyl whereby carbon monoxide is released with nickel metal in situ with the formation of tolylene diisocyanate, and heating the mass to drive off the water as steam with recovery of a residue comprising tolylene diisocyanate.

References Cited in the file of this patent

Arnold et al.: Chemical Reviews, vol. 57, No. 1 (Feb. 1957), page 51. (Copy in Scientific Library.)